(12) United States Patent
Francis et al.

(10) Patent No.: US 9,505,066 B2
(45) Date of Patent: Nov. 29, 2016

(54) ROTARY CUTTING TOOL WITH REGRINDABLE CUTTING INSERTS

(71) Applicant: Kennametal Inc., Latrobe, PA (US)

(72) Inventors: Mark Alan Francis, Solon, OH (US); Dennis James Broadway, Parma, OH (US)

(73) Assignee: KENNAMETAL INC., Latrobe, PA (US)

( * ) Notice: Subject to any disclaimer, the term of this patent is extended or adjusted under 35 U.S.C. 154(b) by 116 days.

(21) Appl. No.: 14/449,401

(22) Filed: Aug. 1, 2014

(65) Prior Publication Data

US 2016/0031020 A1 Feb. 4, 2016

(51) Int. Cl.
| | |
|---|---|
| *B26D 1/12* | (2006.01) |
| *B23C 5/20* | (2006.01) |
| *B23C 5/10* | (2006.01) |
| *B24B 3/02* | (2006.01) |
| *B24B 3/06* | (2006.01) |

(52) U.S. Cl.
CPC ............... *B23C 5/207* (2013.01); *B23C 5/109* (2013.01); *B24B 3/021* (2013.01); *B24B 3/06* (2013.01); *B23C 2200/0416* (2013.01); *B23C 2200/16* (2013.01); *B23C 2200/164* (2013.01); *B23C 2200/165* (2013.01)

(58) Field of Classification Search
CPC .................... B23C 2200/16; B23C 2200/164; B23C 2200/165; B23C 2200/203; B23C 2200/0416; B23C 5/109; B23C 5/207; B24B 3/06; B24B 3/021
USPC ...................... 407/113, 42, 61–63, 56, 40, 48
See application file for complete search history.

(56) References Cited

U.S. PATENT DOCUMENTS

| | | | | |
|---|---|---|---|---|
| 4,251,172 | A * | 2/1981 | Durand ................. | B23C 5/1036 407/115 |
| 4,569,619 | A * | 2/1986 | Newton ............... | B23C 5/2221 407/114 |
| 5,692,860 | A * | 12/1997 | Kramer ................... | B23C 5/109 407/113 |
| 6,203,251 | B1 * | 3/2001 | Oppelt ................... | B23C 5/109 407/113 |
| 7,390,151 | B2 * | 6/2008 | Martin .................... | B23C 5/109 407/41 |
| 7,775,750 | B2 * | 8/2010 | Satran .................... | B23C 5/207 407/113 |
| 7,794,182 | B2 * | 9/2010 | Lehto ................... | B23C 5/1045 407/113 |

(Continued)

FOREIGN PATENT DOCUMENTS

DE 112006001553 T5 4/2008

OTHER PUBLICATIONS

Jun. 21, 2016-First Office Action.

*Primary Examiner* — Sara Addisu
(74) *Attorney, Agent, or Firm* — Matthew S. Bedsole (57) ABSTRACT

A rotary cutting tool includes a cutter body having a plurality of insert-receiving pockets. Each pocket includes a bottom support surface, an axial support surface, a radial support surface, a top clearance surface and an intermediate clearance surface extending between the axial support surface and the top clearance surface. A cutting insert includes a helical top surface, a helical side surface, a side surface opposite the helical side surface, a pair of opposed side walls, a bottom surface, and a cutting edge formed at an intersection between the helical top surface and the helical side surface. The cutting insert further includes an undercut for accommodating the axial support surface, the top clearance surface and the intermediate clearance surface of the pocket when the cutting insert is mounted in the pocket.

14 Claims, 11 Drawing Sheets

(56) References Cited

U.S. PATENT DOCUMENTS

| | | | | |
|---|---|---|---|---|
| 8,356,960 B2* | 1/2013 | Orlov | | B23C 5/109 407/103 |
| 8,696,254 B2* | 4/2014 | Satran | | B23C 5/109 407/113 |
| 2003/0017014 A1* | 1/2003 | Morgulis | | B23C 5/109 407/34 |
| 2003/0223828 A1* | 12/2003 | Craig | | B23C 5/109 407/35 |
| 2003/0223829 A1* | 12/2003 | Craig | | B23C 5/109 407/40 |
| 2005/0117981 A1* | 6/2005 | Satran | | B23C 5/08 407/117 |
| 2006/0280567 A1* | 12/2006 | Craig | | B23C 5/109 407/113 |
| 2006/0280568 A1* | 12/2006 | Craig | | B23C 5/109 407/113 |
| 2007/0217873 A1 | 9/2007 | Martin | | |
| 2013/0195568 A1* | 8/2013 | Voege | | B23C 5/1045 407/40 |
| 2014/0010607 A1* | 1/2014 | Wandeback | | B23F 21/128 407/113 |
| 2014/0212227 A1* | 7/2014 | Bitner | | B23C 5/207 407/40 |
| 2014/0321927 A1* | 10/2014 | Craig | | B23B 27/10 407/11 |
| 2016/0158853 A1* | 6/2016 | Davis | | B23C 5/109 407/34 |

* cited by examiner

ROTARY CUTTING TOOL WITH REGRINDABLE CUTTING INSERTS

BACKGROUND OF THE INVENTION

1. Field of the Invention

The invention relates to rotary cutting tools with cutting inserts mounted thereon, and in particular to a milling cutter with helical cutting inserts that can be reground while mounted on the cutter body to provide a smooth cut on the workpiece.

2. Description of Related Art

One of the current concerns in indexable finish style milling is the stepped or wavy surface on the milled surface resulting from current technology, specifically in the areas of face and end milling. This stepped, uneven or otherwise irregular finish is typically a result of the type, position and location of the cutting inserts. This stepping is particularly relevant in attempts at all-in-one mills, that is mills capable of three dimensional milling, including plunging, ramping, circle interpolating, facing, and end milling with the same mill.

Cutting inserts that are not properly aligned along the flutes of the milling cutter will provide such stepping. For example, on helical milling cutters the inserts must be aligned to follow the curved contour of the helix and any misalignment results in stepping or other irregular finish such as a groove or lip where one insert is radially outward further than adjacent inserts. In addition, cutting inserts that have substantially rectangular configurations (that is, with long, flat cutting edges) will provide such stepping. This stepping is caused by the rectangular configuration of the insert removing excessive material from the workpiece at or approaching the corners of the inserts thereby causing stepping. In contrast, cutting inserts that have an arc-like periphery along its entire cutting surface (radiused corners that extend across the whole cutting edge) remove excess material from the workpiece along the mid-section of the cutting insert, thereby causing valleys.

According to the milling users, this stepped surface is often unacceptable, particularly when a finished, not rough, flat surface is desired. This stepping is unacceptable because stress points form at each or some of the inner and outer edges of the steps as these edges are often well defined. This forces the milling user to thereafter finish mill the surface that is an additional time consuming and expense-adding step.

Such improvement continues to be sought by mill users in various industries because such reduction or complete elimination of all stepping and waviness will increase the overall life of the metal end product by reducing and/or eliminating stress, fatigue and other undesirable forces working against the metal end product. In conjunction with this, if such milling cutter could perform all or substantially all of the typical milling steps including ramping, plunging, circle interpolation, facing and end milling, then significant cost and time reduction would also be achieved. Finally, if all such milling steps could be achieved by one milling cutter, the cutter must have a reasonable life as these various steps involve different concerns and factors including the subjecting of the cutter to large axial, radial, and tangential forces, possibly simultaneously.

SUMMARY OF THE INVENTION

The problem of reducing or eliminating all stepping and waviness on the workpiece is solved by providing a rotary cutting tool, such as a milling cutter with helical cutting inserts that can be reground while mounted on the milling cutter.

In one aspect of the invention, a rotary cutting tool comprises a cutter body having a plurality of insert-receiving pockets. Each pocket includes a bottom support surface, an axial support surface and a radial support surface. Each pocket further includes a top clearance surface and an intermediate clearance surface extending between the axial support surface and the top clearance surface. A plurality of cutting inserts are mounted in the insert-receiving pockets of the cutter body. Each cutting insert includes a helical top surface, a helical side surface, a side surface opposite the helical side surface, a pair of opposed side walls, a bottom surface, and a cutting edge formed at an intersection between the helical top surface and the helical side surface. The cutting insert further includes an undercut for accommodating the axial support surface, the top clearance surface and the intermediate clearance surface of the pocket when the cutting insert is mounted in the pocket.

In another aspect of the invention, a cutting insert comprises a helical top surface, a helical side surface, a side surface opposite the helical side surface, a pair of opposed side walls, a bottom surface, and a cutting edge formed at an intersection between the helical top surface and the helical side surface. The cutting insert further includes an undercut for accommodating an axial support surface, a top clearance surface and an intermediate clearance surface of a pocket of a rotary cutting tool when the cutting insert is mounted therein.

In yet another aspect of the invention, a method of manufacturing a rotary cutting tool, comprises:
   mounting a plurality of cutting inserts within a respective pocket of a cutter body;
   determining a location of each cutting insert within a helical grouping of cutting inserts that are associated with a corresponding flute formed in the cutter body;
   grinding a helical side surface to generate a radial rake angle on each cutting insert within the helical grouping of cutting inserts;
   grinding a primary relief surface on a helical top surface to generate a finish cutting diameter, D, and a cutting edge on each cutting insert within the helical grouping of cutting inserts; and
   grinding a secondary relief surface on the helical top surface of the cutting insert within the helical grouping of cutting inserts.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Referring now to FIGS. 1-4, a rotary cutting tool is shown generally at 10 according to an embodiment of the invention. In the illustrated embodiment, the rotary cutting tool 10 comprises a milling cutter including a cutter body 12 with helical cutting inserts 14 that are designed to create a continuous cutting helix. The cutter body 12 is embodied as a helical end mill that includes the plurality of general milling inserts 14 for ramping, circle interpolating, facing and end milling. Although the helical cutting inserts 14 are shown in a helical end mill embodiment, the improved cuttings inserts 14 are designed for use in any type of milling, such as shell milling. In addition, several of the concepts described below on the helical mill including overlapping inserts by offsetting, staggering or other methods are also designed for use on other types of mills.

Figure 1:
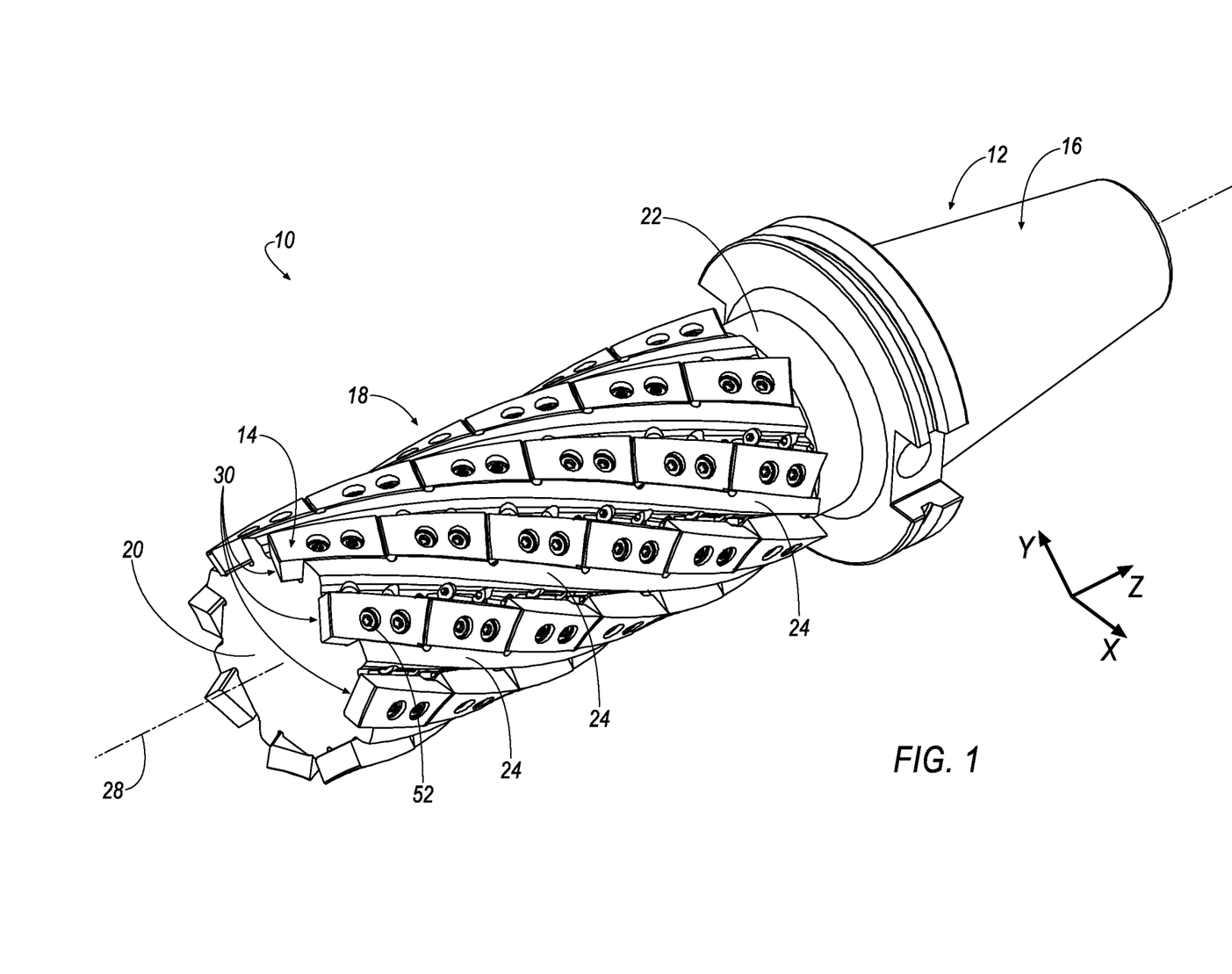
FIG. 1 is an isometric view of a rotary cutting tool with a plurality of regrindable cutting inserts mounted thereon according to an embodiment of the invention.
Figure 2:
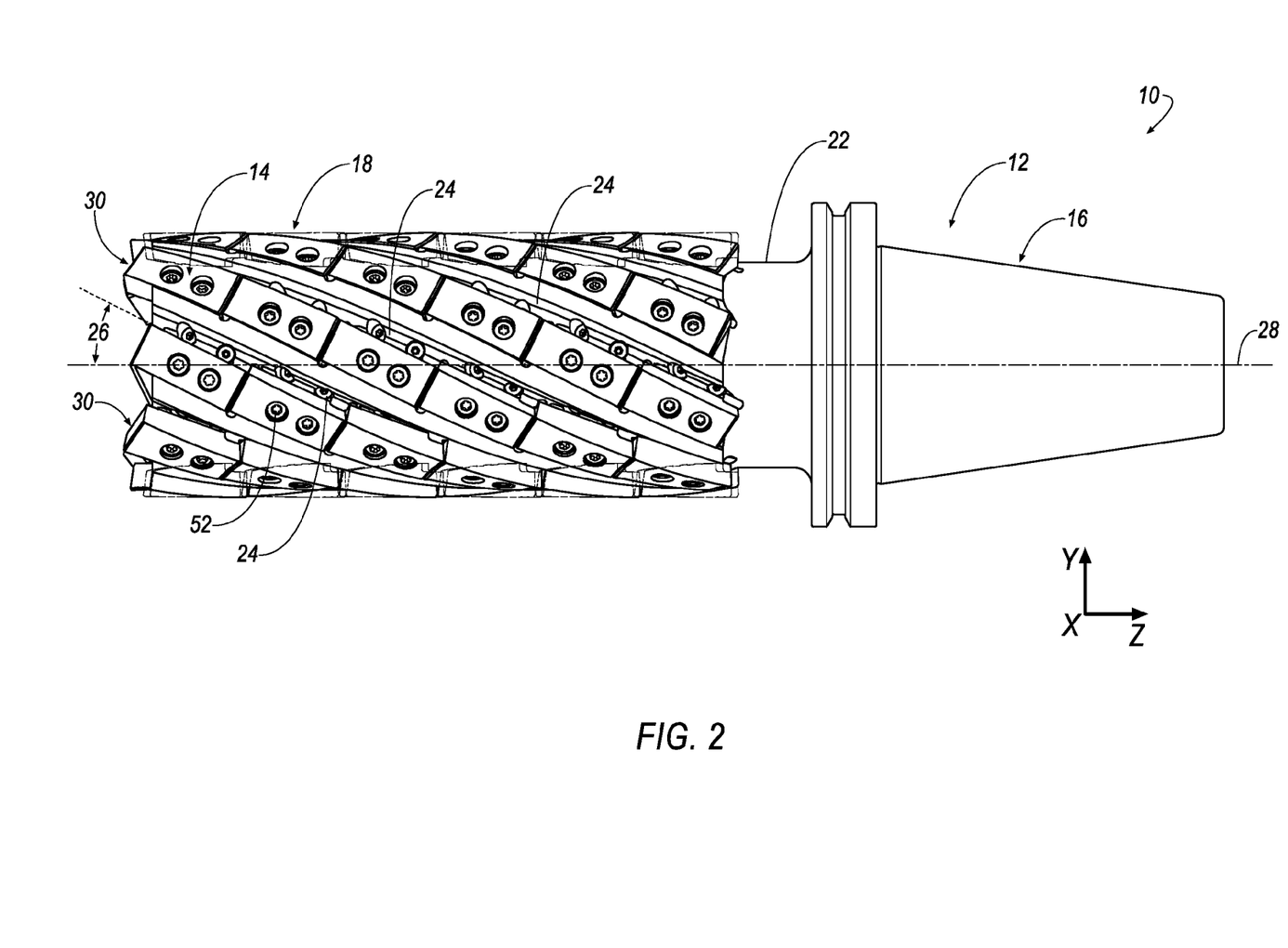
FIG. 2 is a side view of the rotary cutting tool of FIG. 1.

The cutter body 12 is of an elongated and generally cylindrical shape. The milling cutter body 12 comprises a shank 16 and a head 18. The shank 16 is configured so as to be capable of insertion and securing within the spindle of a milling machine (not shown) as is well known in the art. The shank 16 may be of any shape or design so as to be capable of this insertion and securing. Such designs include, but are not limited to, V-flange, taper, shell mill mount, and Weldon shank.

The head 18 is generally a cylindrical or substantially cylindrical body or shaft extending axially from the shank 16 to an end face 20, thereby defining an exterior surface 22 therebetween. The exterior surface 22 of the head 18 preferably includes a plurality of helical chip grooves or flutes 24. It will be appreciated that the invention is not limited by the number of flutes 24. For example, in the illustrated embodiment, the cutter tool 10 includes a total of eight (8) flutes 24, although any number of flutes are contemplated by the invention. Each flute 24 is preferably cut into the exterior surface 22 in a helical or spiral manner that extends from the end face 20 to substantially the shank 16. In one embodiment, each flute 24 is cut into the exterior surface 22 at a helix angle 26 of about between about ten (10) degrees and about forty (40) degrees with respect to a central, longitudinal axis 28 of the milling cutter body 12.

Figure 3:
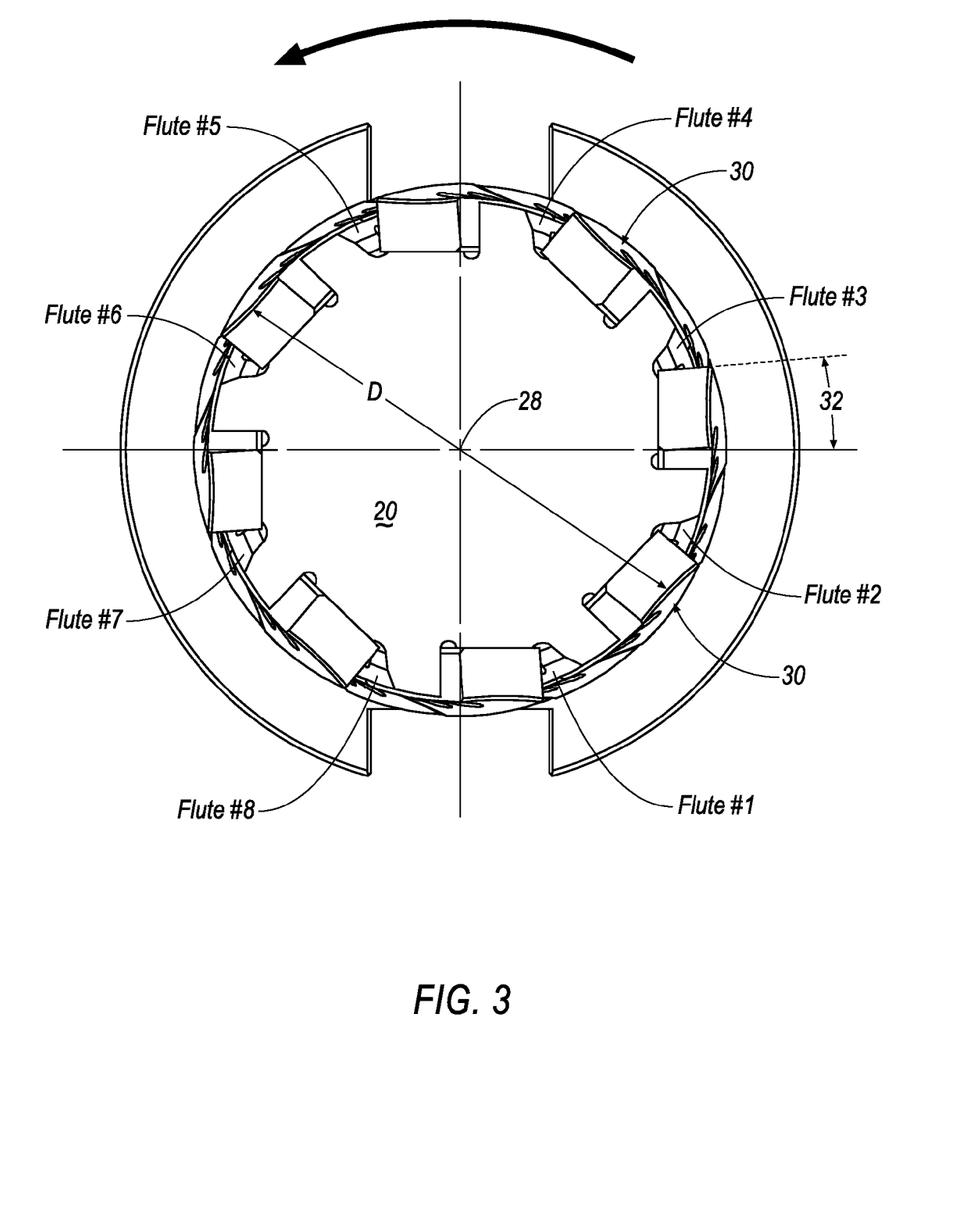
FIG. 3 is an end view of the rotary cutting tool of FIG. 1.

Each flute 24 is disposed between and associated with a helical grouping 30 of helical cutting inserts 14. In other words, a helical grouping 30 of cutting inserts 14 are associated with a corresponding flute 24. For example, one helical grouping 30 of six (6) cutting inserts 14 is associated with flute #1, another helical grouping 30 of six (6) cutting insert 14 is associated with flute #2, and so on. There is a one-to-one correspondence between the number of helical groupings 30 and the number of flutes 24. As mentioned above, the rotary cutting tool 10 in the illustrated embodiment includes a total of eight (8) flutes 24. Thus, the rotary cutting tool 10 includes a total of eight (8) helical groupings 30 of cutting inserts 14, as shown in FIG. 3. Each insert 14 in each helical grouping 30 is mounted on the cutter body 12 at a rake angle 32 of between about five (5) degrees and about thirty (30) degrees with respect to the x-axis, which is perpendicular to the central, longitudinal axis 28 (z-axis) of the cutter body 12. As shown in FIG. 3, the cutter body 12 rotates about the central, longitudinal axis 28 in the direction of the arrow.

Figure 4:
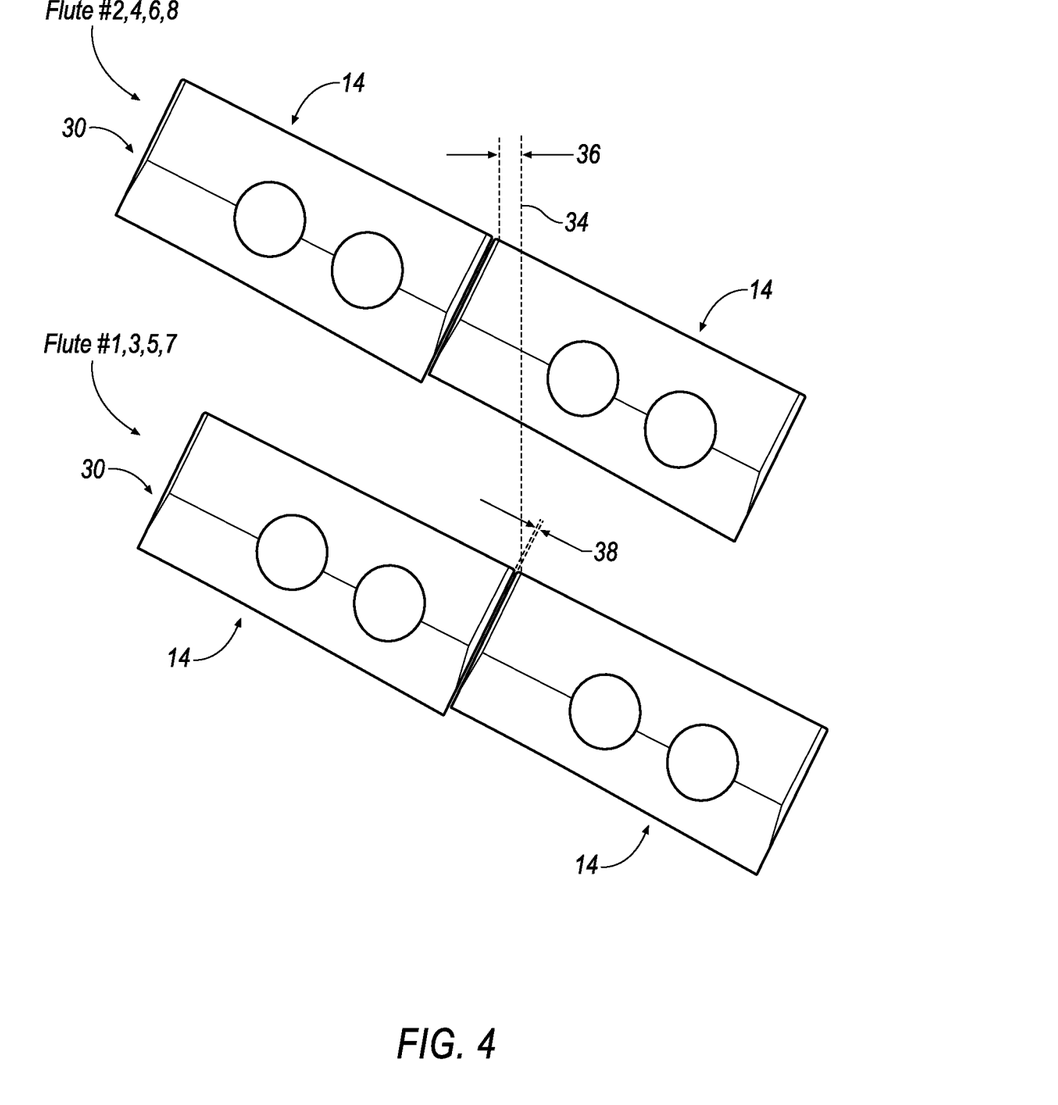
FIG. 4 is a schematic representation of the regrindable cutting inserts of associated with one flute being offset with respect to the regrindable cutting inserts of an adjacent flute.

In accordance with one of the aspects of the invention, the inserts 14 in adjacent groupings 30 are offset or staggered in any given cross sectional plane 34 through the shank 16 by an offset distance 36, as shown in FIG. 4. The purpose of the offset distance 36 is to prevent the gaps between the cutting inserts 14 in one helical grouping 30 to not be aligned in any given cross sectional plane 34 with the gaps between the cutting inserts 14 in the adjacent helical grouping 30, thereby providing a fine finish to the workpiece. Specifically, each cutting insert 14 in one helical grouping 30 is offset by the offset distance 36 with respect to the corresponding cutting insert 14 in the adjacent helical grouping 30 previously presented to the workpiece. In other words, the cutting inserts 14 associated with flute #'s 1, 3, 5, and 7 are offset with the cutting inserts 14 associated with flute #'s 2, 4, 6 and 8. For example, the cutting inserts 14 associated with flute #1 are offset by the offset distance 36 with respect to the corresponding cutting inserts 14 associated with flute #2, but the corresponding cutting inserts 14 associated with flute #3 are not offset with the corresponding cutting inserts 14 associated with flute #1. Similarly, the cutting inserts 14 associated with flute #2 are offset with the corresponding cutting inserts 14 associated with flute #3, but the corresponding cutting inserts 14 associated with flute #2 are not offset with the corresponding cutting inserts 14 associated with flute #4, and so on. The magnitude of the offset distance 36 depends upon the dimensions of the cutter body 12 and cutting insert 14, as well as other factors. In one specific embodiment, the offset distance 36 is greater than zero (0.0) inches, but less than 0.1 inches (2.5 mm). In addition, it is preferable that the cutting inserts 14 associated with the same helical grouping 30 are separated by a gap 38 when mounted on the cutter body 12, as shown in FIG. 4. The gap 38 provides clearance between adjacent cutting insert 14 of the same helical grouping 30.

As previously mentioned, there is a one-to-one correspondence between the number of helical groupings 30 and the number of flutes 24. The measurement of effective flute areas or flutes can be determined by how many flutes 24 need to pass in order to cut one complete profile on the workpiece (not shown). Because the groupings 30 overlap in the manner described above, only two flutes 24 (or two helical groupings 30 of inserts 14) are needed to cut one profile. Thus, in the illustrated embodiment, the eight helical groupings 30 of cutting insert 14 define a four (4) effective flute cutter system, thereby providing a highly productive cutting configuration.

Figure 5:
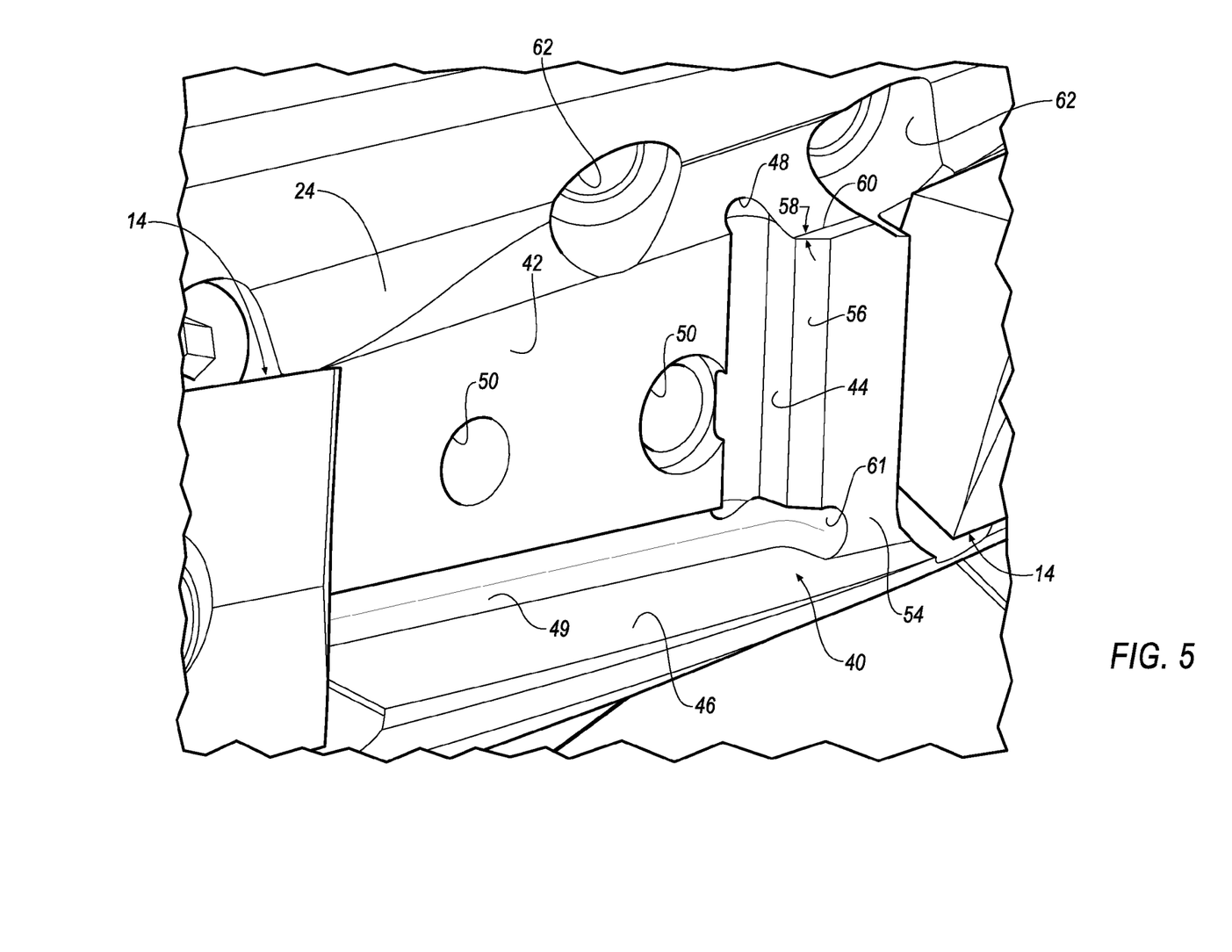
FIG. 5 is an enlarged isometric view of the insert-receiving pocket of the rotary cutting tool according to an embodiment of the invention.
Figure 6:
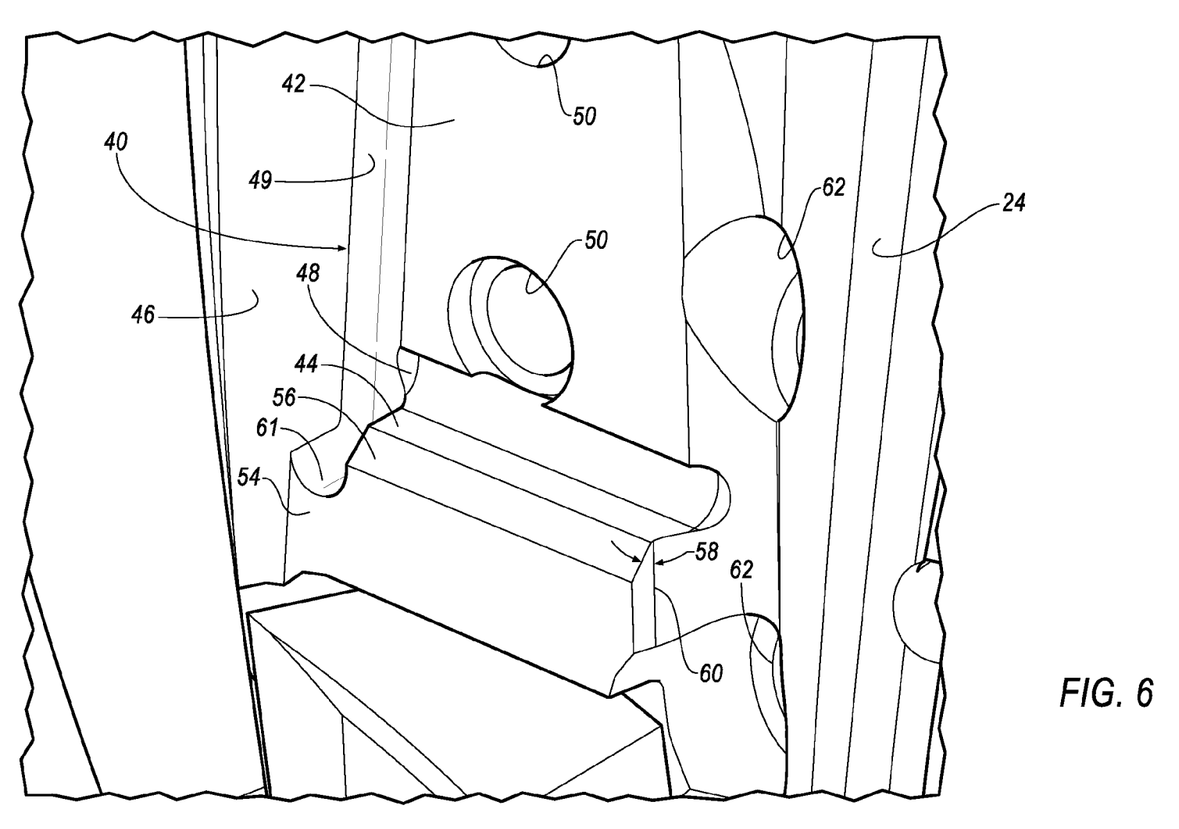
FIG. 6 is another enlarged isometric view of the insert-receiving pocket of the rotary cutting tool according to an embodiment of the invention.
Figure 7:
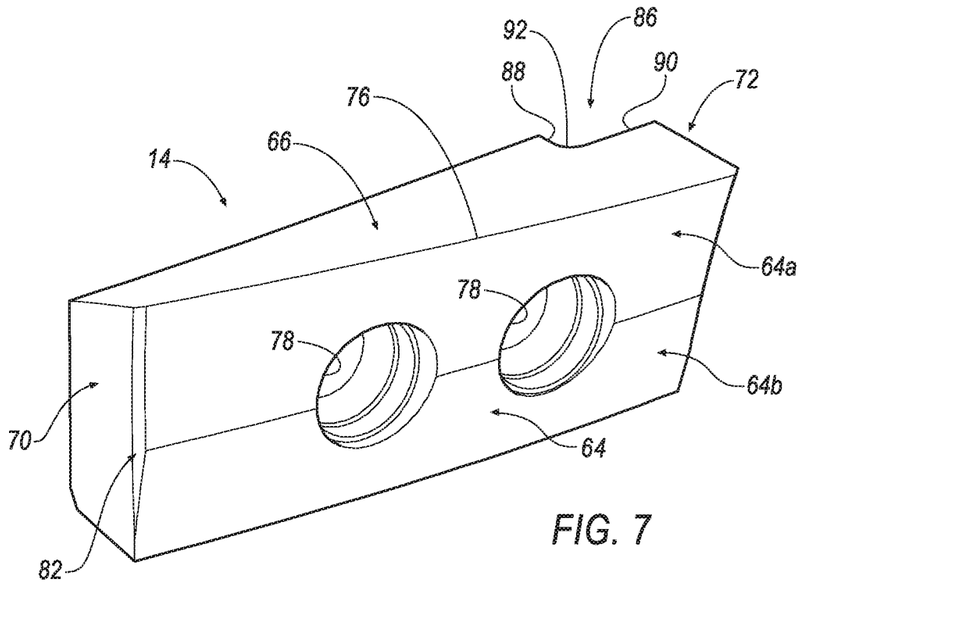
FIG. 7 is an isometric view of the regrindable cutting insert according to an embodiment of the invention.
Figure 8:
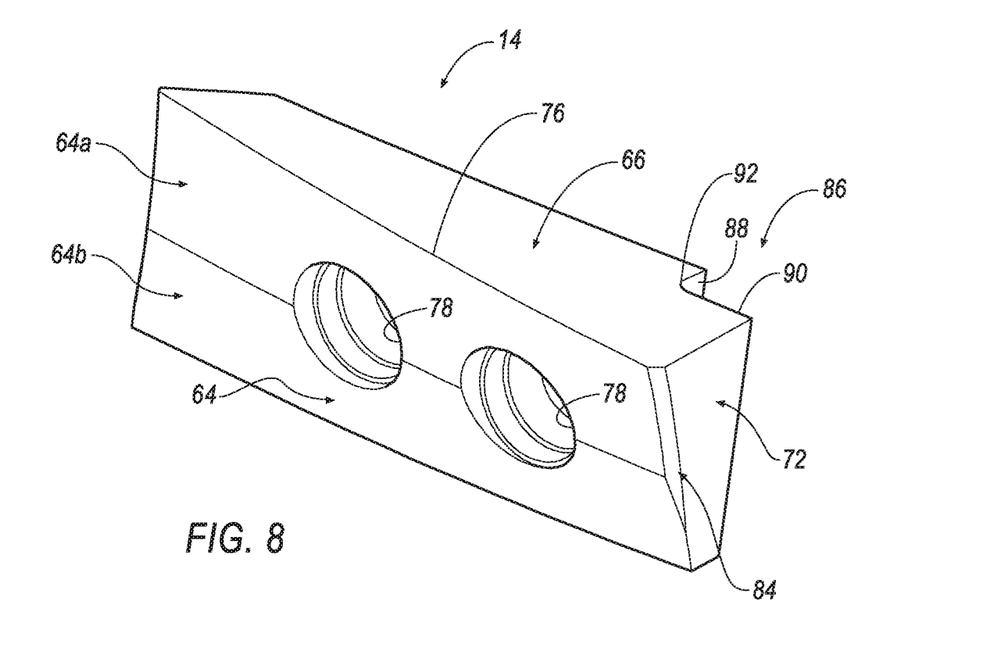
FIG. 8 is another isometric view of the regrindable cutting insert of FIG. 7.

Referring now to FIGS. 5 and 6, the cutter body 12 includes a plurality of insert-receiving pockets 40 for mounting a respective helical cutting insert 14 therein. Each pocket 40 includes a bottom support surface 42, an axial support surface 44 and a radial support surface 46. A corner relief 48 is provided between the bottom support surface 42 and the axial support surface 44, and a corner relief 49 is provided between the bottom support surface 42 and the radial support surface 46. A pair of threaded bores 50 extend radially inward from the bottom support surface 42 and is substantially perpendicular thereto In the assembled position of the rotary cutting tool 10, each of the cutting inserts 14 is retained in the pocket 40 by an insert screw 52 (FIGS. 1 and 2) that passes through a through bore of the cutting insert 14 and is threaded into the threaded bore 50 in the pocket 40.

The insert pocket 40 also includes a top clearance surface 54 that is substantially parallel to the bottom support surface 42 (and substantially perpendicular to the axial support surface 44). An intermediate clearance surface 56 extends between the axial support surface 44 and the top clearance surface 54. The intermediate clearance surface 56 is formed at an angle 58 with respect to a plane 60 that is substantially parallel to the bottom support surface 42 (and top clearance surface 54) to provide clearance for the cutting insert 14 when mounted in the pocket 40. The angle 58 is in a range between about twenty-five (25) degrees and about seventy-five (75) degrees. In one embodiment, for example, the angle 58 is about forty-five (45) degrees. A corner relief 61 extending from the bottom support surface 42 to the top clearance surface 54 is provided between the radial support surface 46 and the axial support surface 44. One or more coolant holes 62 may be provided adjacent each pocket 40 for providing coolant to the interface between the cutting insert 14 and the workpiece (not shown). In the illustrated embodiment, the coolant holes 62 are formed in the flutes 24.

Figure 9:
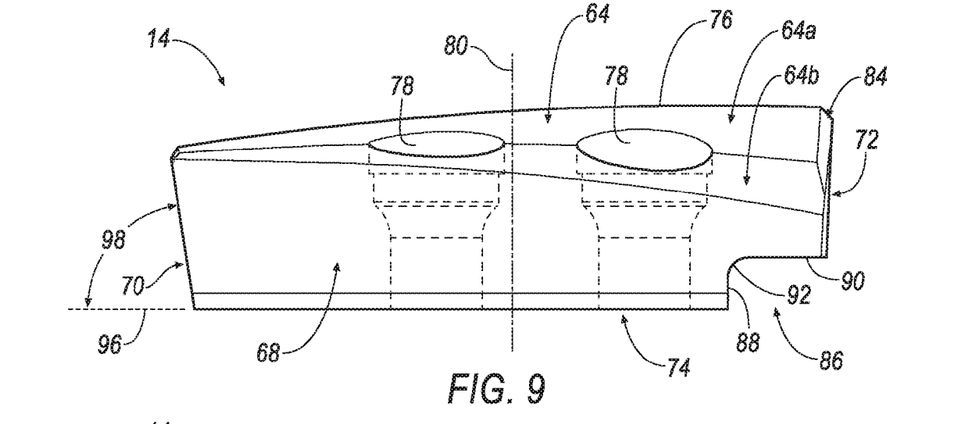
FIG. 9 is a side view of the regrindable cutting insert of FIG. 7.
Figure 10:
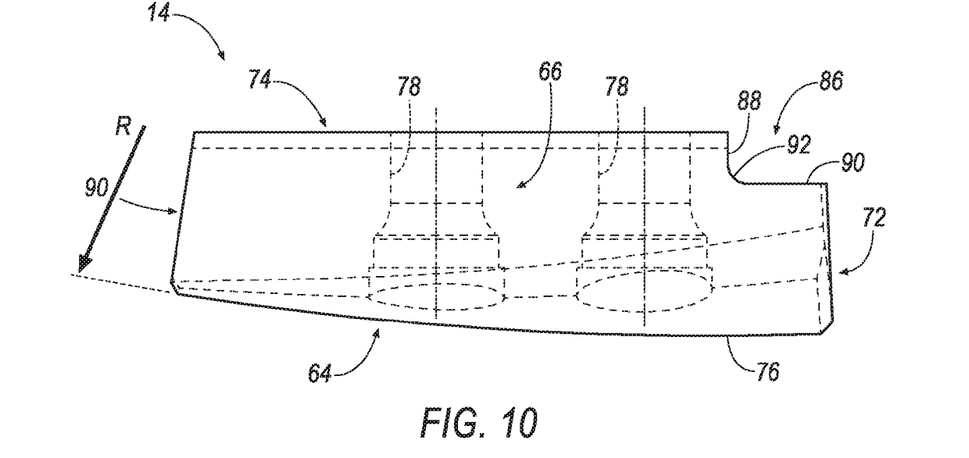
FIG. 10 is another side view of the regrindable cutting insert of FIG. 7.

Referring now to FIGS. 7-14, the cutting insert 14 is shown according to an embodiment of the invention. In general, the cutting insert 14 includes a helical top surface 64, a helical side surface 66, a side surface 68 opposite the helical side surface 66, a pair of opposed side walls 70, 72, and a bottom surface 74. The helical top surface 64 of the insert 14 is formed with a radius, R, as shown in FIG. 10. Preferably, the radius, R, is approximately the same as the cutting diameter, as shown in FIG. 3. In addition, the helical top surface 64 preferably has a radius of curvature follows the curvature of the outer surface of the head 18. In this manner, the helical top surface 64 of the insert 14 provides for a helical cut that follows the curvature of the outer surface of the head 18, unlike conventional inserts with front faces or surfaces that are substantially flat. In addition, the helical top surface 64 is divided into two surfaces: 1) a primary relief surface 64a, and 2) a secondary relief surface 64b.

Figure 11:
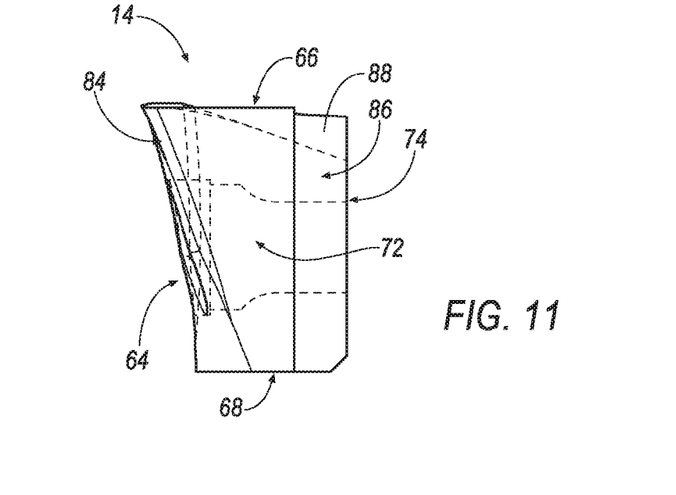
FIG. 11 is an end view of the regrindable cutting insert of FIG. 7.
Figure 12:
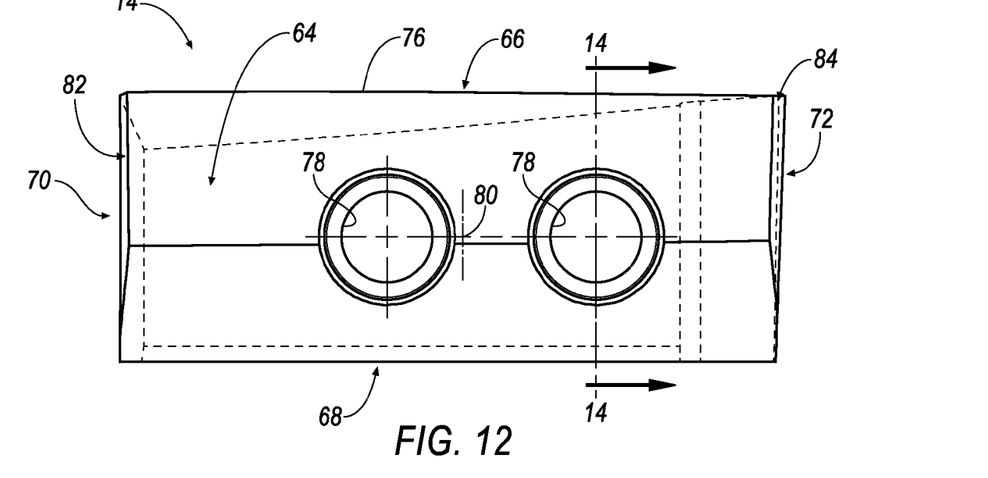
FIG. 12 a top view of the regrindable cutting insert of FIG. 7.
Figure 14:
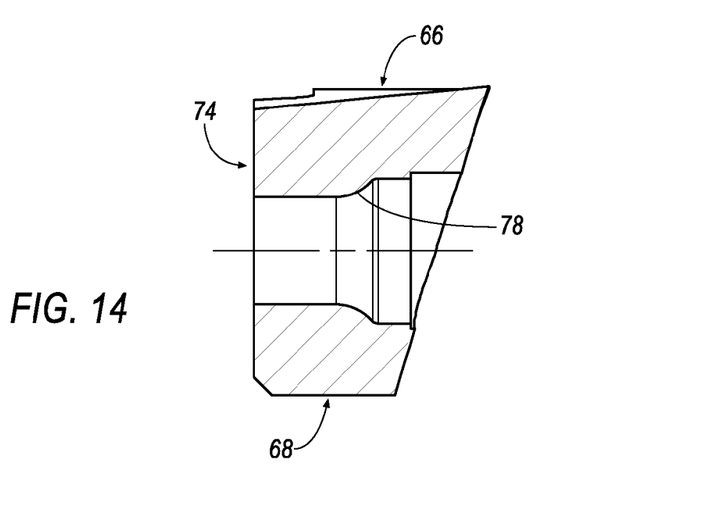
FIG. 14 is a cross-sectional view of the regrindable cutting insert taken along line 14-14 of FIG. 12.

A cutting edge 76 is formed at the intersection between the helical top surface 64 and the helical side surface 66. Specifically, the cutting edge 76 is formed at the intersection between the primary relief surface 64a and the helical side surface 66. As further described below, one aspect of the invention is that the helical top surface 64 and/or the helical side surface 66 can be ground while the cutting insert 14 is mounted in the pocket 40. This aspect of the invention allows a sharp cutting edge 76 to be produced without removing the cutting insert 14 from the pocket 40. The cutting insert 14 also includes a pair of countersunk bores 78 extending from the helical top surface 64 to the bottom surface 74 for receiving a respective insert screw 52 to mount the cutting insert 14 in the pocket 40. It is noted that the countersunk bores 78 are offset from a central axis 80 of the cutting insert 14 such that the cutting insert 14 can only be mounted one way on the cutter body 12, as shown in FIGS. 9 and 12. The cutting insert 14 also includes a chamfer 82 between the helical top surface 64 and the side wall 70 and a chamfer 84 between the helical top surface 64 and the side wall 72. The chamfers 82, 84 provide clearance between adjacent cutting inserts 14 of the same helical grouping 30 when mounted on the cutter body 12. As shown in FIGS. 9, 11 and 14, the helical top surface 64 causes the helical side surface 66 to have a greater thickness than the opposed side surface 68.

In accordance with one of the aspects of the invention, the cutting insert 14 includes an undercut 86 for accommodating the axial support surface 44, the top clearance surface 54 and the intermediate clearance surface 56 of the pocket 40 when the cutting insert 14 is mounted in the pocket 40. Specifically, the undercut 86 includes a first surface 88, a second surface 90 and a radius 92 therebetween. The first surface 88 of the undercut 86 is substantially perpendicular to a plane 96 that is parallel to the bottom surface 74, and the second surface 90 of the undercut 86 is substantially parallel to the plane 96. Thus, the first surface 88 is substantially perpendicular to the second surface 90, and vice versa. More specifically, the first surface 88 extends inward from the bottom surface 74 toward the helical top surface 64 and entirely across the cutting insert 14 from the helical side surface 66 to the opposite side surface 68. The second surface 90 extends inward from the side wall 72 toward the side wall 70 and entirely across the cutting insert 14 from the helical side surface 66 to the opposite side surface 68. In one embodiment, the second surface 90 extends a greater depth or distance from the side wall 72 than the first surface 88 from the bottom surface 74, as shown in FIGS. 9 and 10.

Figure 13:
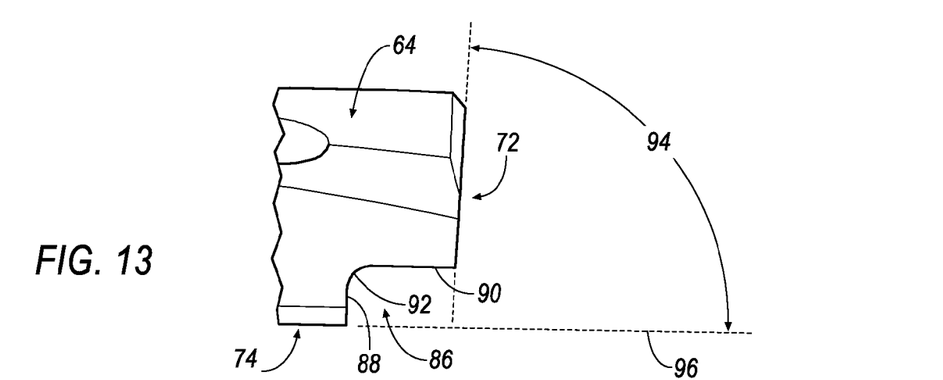
FIG. 13 is a partial side view of the regrindable cutting insert of FIG. 7 showing the axial seating portion of the cutting insert.

In addition, the side wall 72 is formed at an acute angle 94 of less than ninety (90) degrees with respect to the plane 96 that is parallel to the bottom surface 74, as shown in FIG. 13. In one embodiment, the angle 94 is between about eighty-five (85) degrees and ninety (90) degrees. For example, in one specific embodiment, the angle 94 is about eighty-seven (87) degrees. The angle 94 enhances the interlocking effect between the cutting insert 14 and the insert-receiving pocket 12.

Similarly to the side wall 72, the side wall 70 is also formed at an acute angle 98 of less than ninety (90) degrees with respect to the plane 96 that is parallel to the bottom surface 74, as shown in FIG. 9. In one embodiment, the angle 98 is between about sixty (60) degrees and about eighty-nine (89) degrees. The angle 98 enhances the interlocking effect and proper alignment between adjacent cutting inserts 14 in the same helical grouping 30.

In accordance with another of feature of the invention, the helical top surface 52 of the insert 14 is formed with a radius, R, as best shown in FIG. 10. Preferably, the radius, R, is approximately the same as the cutting diameter. As shown in FIG. 3, the top surface 52 has a radius of curvature follows the curvature of the outer surface of the head 18. In this manner, the radiused helical top surface 64 of the insert 14 provides for a helical cut that follows the curvature of the outer surface of the head 18, unlike conventional inserts with front faces or surfaces that are substantially flat.

Figure 15:
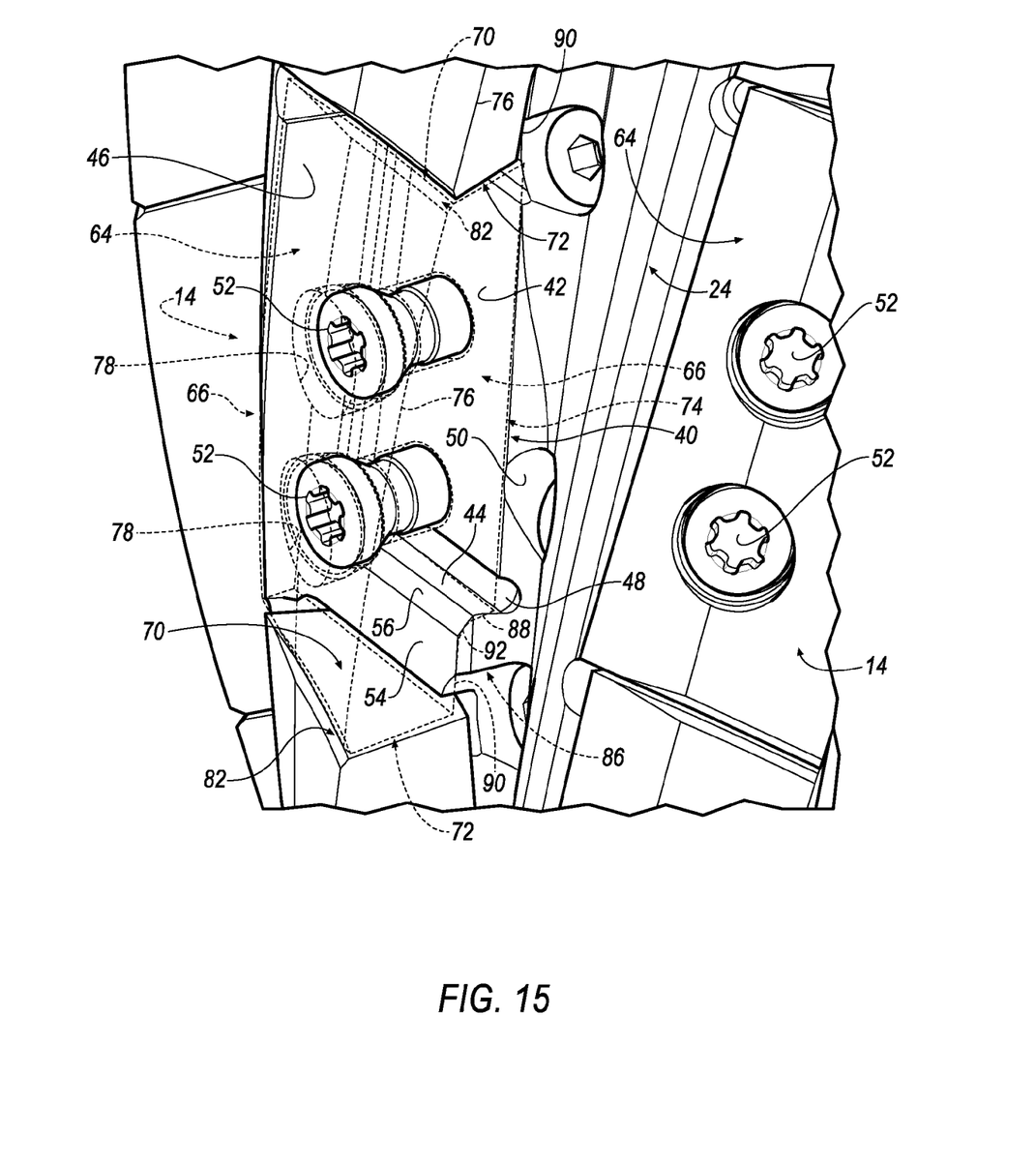
FIG. 15 is an enlarged isometric view of the regrindable cutting insert (shown by dashed lines) mounted in the insert-receiving pocket of the rotary cutting tool according to an embodiment of the invention.
Figure 16:
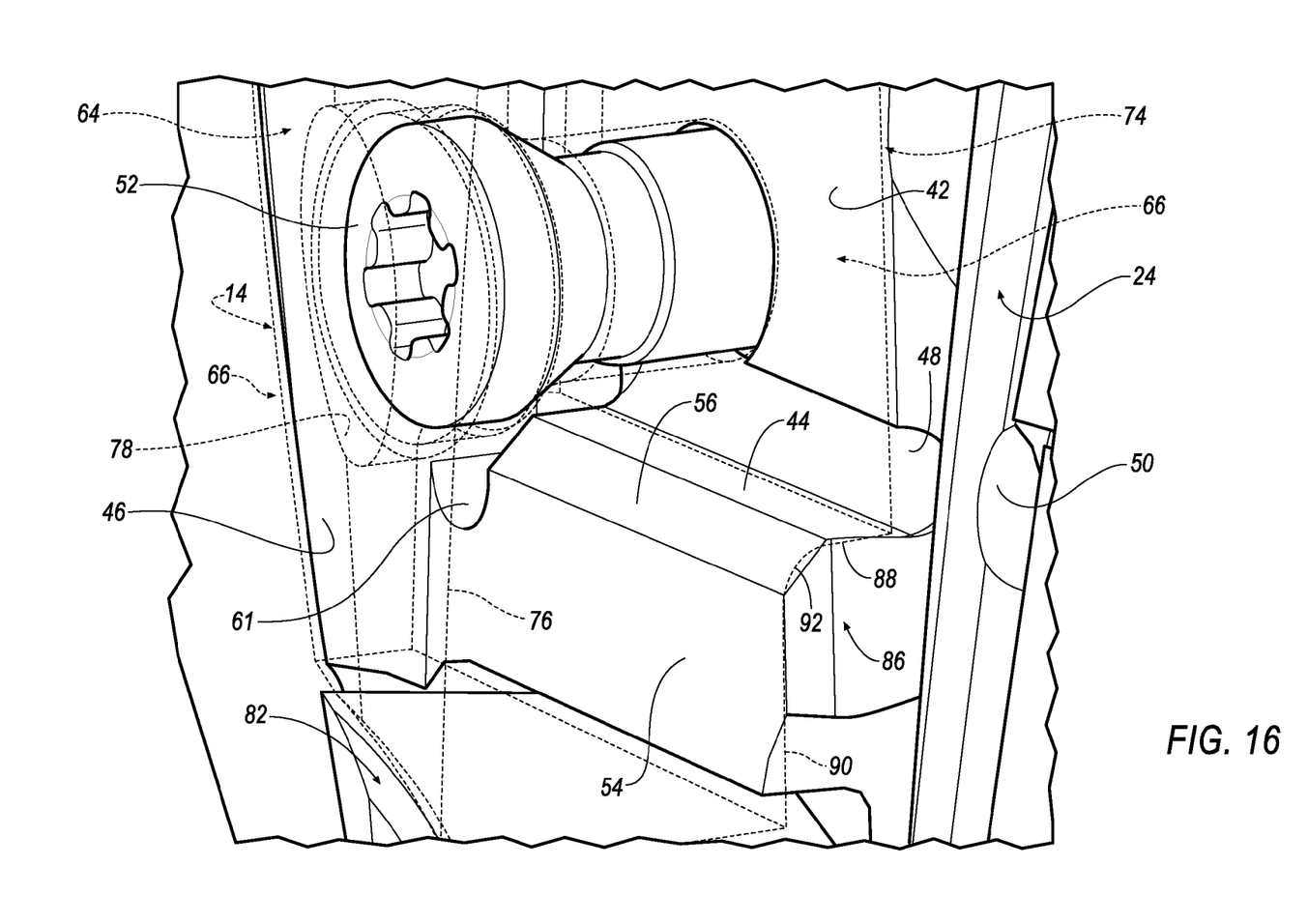
FIG. 16 another enlarged isometric view of the regrindable cutting insert (shown by dashed lines) mounted in the insert-receiving pocket of the rotary cutting tool according to an embodiment of the invention.

FIGS. 15 and 16 illustrate the cutting insert 14 mounted in the pocket 40 of the cutter body 12. When properly mounted in the pocket 40, the bottom surface 74 of the cutting insert 14 contacts the bottom support surface 42 of the pocket 40. In addition, the first surface 88 of the cutting insert 14 contacts the axial support surface 44 of the pocket 40, but the second surface 90 of the cutting insert 14 does not contact the top clearance surface 54 of the pocket 40. Further, the side surface 68 of the cutting insert 40 contacts the radial support surface 46 of the pocket 40. As a result of the cutting insert 14 contacting the pocket 40 at three different locations, the cutting insert 14 is firmly secured within the pocket 40 of the cutter body 12.

As mentioned earlier, the countersunk bores 78 are offset with respect to a central axis 80 of the cutting insert 14 such that the cutting insert 14 can only be mounted one way on the cutter body 12. Specifically, the countersunk bores 78 are located closer to the undercut 86 of the cutting insert 14. As a result, the insert screws 52 exert an additional downward force on the cutting insert 14 in the region of the undercut 86 when threaded into the cutter body 12 to further secure the cutting insert 14 in the pocket 40 of the cutter body 12.

Another aspect of the invention is that the helical top surface (64) and/or the helical side surface (66) can be ground by a grinding tool when the cutting insert 14 is mounted in the pocket 40 of the cutter body 12. This aspect of the invention allows a sharp cutting edge 76 to be produced without removing the cutting insert 14 from the pocket 12. The process of grinding the cutting inserts 14 while mounted in the pocket 40 of the cutter body 12 will now be described.

First, the cutting inserts 14 are mounted in a respective pocket 40 of the cutter body 12. Next, cutting tool 10 is loaded into a computer numerical control (CNC) cutter grinder (not shown). Then, a probe is inserted into a flute 24 associated with a helical grouping 30 to determine the location of each cutting insert 14 within the helical grouping 30 (FIG. 1). Next, the helical side surface 66 is ground to generate the desired radial rake angle 32 (FIG. 3). Then, the primary relief surface 64*a* is ground to generate the desired finish cutting diameter, D (FIG. 3) and a sharp cutting edge 76. Next, the secondary relief surface 64*b* is ground on the helical top surface 64. Then, an end primary relief angle is ground to generate a corner radius, but only for the cutting inserts 14 of each helical grouping 30 that are located proximate the end face 20 of the cutting tool 10 (FIG. 1). Finally, an end secondary relief angle is ground, but only for the cutting inserts 14 of each helical grouping 30 that are located proximate the end face 20 of the cutting tool 10 (FIG. 1).

As described above, the cutting inserts 14 can be ground and reground while mounted in the pocket 40 of the cutting body 12. As a result, a sharp cutting edge 76 can be produced when the cutting edge 76 becomes dull, thereby extending the life of the cutting insert 14. In addition, by grinding the cutting inserts 14 while mounted in the pocket 40, the cutting edge 76 on each cutting insert 14 is perfectly aligned with the cutting edge 76 of another cutting insert 14 within the same helical grouping 30, thereby eliminating any manufacturing tolerances that exist with conventional cutting inserts.

The patents and publications referred to herein are hereby incorporated by reference.

Having described presently preferred embodiments the invention may be otherwise embodied within the scope of the appended claims.

What is claimed is:

1. A rotary cutting tool, comprising:
   a cutter body having a plurality of insert-receiving pockets, each pocket including a bottom support surface, an axial support surface and a radial support surface, each pocket further including a top clearance surface and an intermediate clearance surface extending between the axial support surface (44) and the top clearance surface; and
   a plurality of cutting inserts mounted in the insert-receiving pockets of the cutter body, each cutting insert including a helical top surface, a helical side surface, a side surface opposite the helical side surface, a pair of opposed side walls, a bottom surface, and a cutting edge formed at an intersection between the helical top surface and the helical side surface, the cutting insert further including an undercut for accommodating the axial support surface, the top clearance surface and the intermediate clearance surface of the pocket when the cutting insert is mounted in the pocket.

2. The cutting tool of claim 1, wherein the undercut includes a first surface, a second surface substantially perpendicular to the first surface, and a radius therebetween.

3. The cutting tool of claim 2, wherein the first surface of the undercut is substantially perpendicular to a plane that is parallel to the bottom surface, and the second surface of the undercut is substantially parallel to the plane.

4. The cutting tool of claim 2, wherein the first surface extends inward from the bottom surface toward the helical top surface and entirely across the cutting insert from the helical side surface to the opposite side surface, and wherein the second surface extends inward from one of the side walls toward the other opposed side wall and entirely across the cutting insert from the helical side surface to the opposite side surface.

5. The cutting tool of claim 4, wherein the second surface extends a greater depth or distance from one of the side walls than the first surface from the bottom surface.

6. The cutting tool of claim 1, wherein the helical top surface of each cutting insert is formed with a radius, R.

7. The cutting tool of claim 1, wherein one of the side walls is formed at an angle less than ninety degrees with respect to a plane that is parallel to the bottom surface of the cutting insert.

8. The cutting tool of claim 1, wherein the cutting insert (14) further includes a pair of countersunk bores (78) that are offset with respect to a central axis (80) of the cutting insert (14) such that the cutting insert (14) can only be mounted one way on the cutter body (12).

9. A cutting insert for a rotary cutting tool, comprising:
   a helical top surface;
   a helical side surface;
   a side surface opposite the helical side surface;
   a pair of opposed side walls;
   a bottom surface;
   a cutting edge formed at an intersection between the helical top surface and the helical side surface; and
   an undercut for accommodating an axial support surface, a top clearance surface and an intermediate clearance surface of a pocket of a rotary cutting tool when the cutting insert is mounted therein;
   the undercut includes a first surface, a second surface substantially perpendicular to the first surface, and a radius therebetween;
   wherein the first surface extends inward from the bottom surface toward the helical top surface and entirely across the cutting insert from the helical side surface to the opposite side surface, and wherein the second surface extends inward from one of the side walls toward the other opposed side wall and entirely across the cutting insert from the helical side surface to the opposite side surface.

10. The cutting insert of claim 9, wherein the first surface of the undercut is substantially perpendicular to a plane that is parallel to the bottom surface, and the second surface of the undercut is substantially parallel to the plane.

11. The cutting tool of claim 9, wherein the second surface extends a greater depth or distance from one of the side walls than the first surface from the bottom surface.

12. The cutting insert of claim 9, wherein the helical top surface of each cutting insert is formed with a radius, R.

13. The cutting insert of claim 9, wherein one of the side walls is formed at an angle less than ninety degrees with respect to a plane (96) that is parallel to the bottom surface of the cutting insert.

14. The cutting insert of claim 9, wherein the cutting insert further includes a pair of countersunk bores that are offset with respect to a central axis of the cutting insert such that the cutting insert can only be mounted one way on the cutter body.

* * * * *